United States Patent [19]

Fauteux et al.

[11] Patent Number: 4,935,317
[45] Date of Patent: Jun. 19, 1990

[54] METHOD FOR PRODUCING SOLID STATE ELECTROCHEMICAL LAMINAR CELL UTILIZING CATHODE ROLLING STEP

[75] Inventors: Denis G. Fauteux, Centerville; Dale R. Shackle, Springboro, both of Ohio

[73] Assignee: MHB Joint Venture, Dayton, Ohio

[21] Appl. No.: 369,376

[22] Filed: Jun. 21, 1989

[51] Int. Cl.$^5$ .............................................. H01M 6/18
[52] U.S. Cl. .................................. 429/192; 429/213; 29/623.5
[58] Field of Search ............... 429/192, 213; 29/623.5; 427/359, 372.2, 331, 115

[56] References Cited

U.S. PATENT DOCUMENTS 4,589,197  5/1986  North ................................. 29/623.1
4,830,939  5/1989  Lee et al. ............................ 429/192

Primary Examiner—Anthony Skapars
Attorney, Agent, or Firm—Thompson, Hine and Flory

[57] ABSTRACT

A process for making a solid state alkali metal anode cell comprising the steps of:
coating a radiation or thermally polymerizable cathode composition layer onto a current collector layer;
rolling the external surface of said cathode composition to provide an external surface having minimal surface discontinuities;
coating an ionically conductive, radiation or thermally polymerizable electrolyte composition layer onto said cathode composition layer;
partially or totally curing said cathode composition and said electrolyte composition;
applying a laminar anode onto said electrolyte composition layer to form a cell assembly and the cell produced thereby is disclosed.

16 Claims, 2 Drawing Sheets

METHOD FOR PRODUCING SOLID STATE ELECTROCHEMICAL LAMINAR CELL UTILIZING CATHODE ROLLING STEP

BACKGROUND OF THE INVENTION

1. Field of the Invention

The present invention relates to the manufacture of a solid state electrochemical cell, and more particularly, a method for producing a rechargeable solid state laminar cell including a lithium anode, an electrolyte, a composite cathode and a current collector, wherein the cathode composition is rolled with a pressure roller during cell manufacture to smoothen the cathode and thereby permit one to use thinner electrolytes and reduce the impedance of the cell.

2. Description of the Prior Art

Solid state rechargeable electrochemical cells are the subject of intense investigation and development. They are described extensively in the patent literature. See, for example, U.S. Pat. Nos. 4,303,748 to Armand; 4,589,197 to North; 4,547,440 to Hooper, et al; and 4,228,226 to Christian. These cells are typically constructed of an alkali metal foil anode, typically lithium foil, an ionically conducting polymeric electrolyte, a composite cathode containing a finely divided transition metal oxide and an electrically-conductive filler, and a current collector. These cells present a viable option to older, more traditional, secondary cells because of their ability to generate a relatively high current per unit area and high storage capacity.

In solid state alkali metal anode laminar cells, internal cell impedance is the product of a number of factors. An internal impedance is associated with each element of the cell, namely the anode layer, the electrolyte layer, the cathode layer, and the current collector. Further, and as is particularly problematic, high impedance can occur at the interfaces between these layers and, in particular, at the electrolyte/cathode interface and at the cathode/current collector interface. Accordingly, to produce an efficient solid state electrochemical laminar cell, the impedance of each of these layers and interfaces must be minimized. The present invention seeks to provide as small an internal impedance as possible at the electrolyte/cathode interface and at the cathode/current collector interface.

Part of the problem in achieving a low cell impedance lies in the failure of the cathode material to form a good electric contact with the current collector. The increase in cell impedance associated with the lack of an optimal electrical contact makes it difficult to recharge the cell.

In theory, optimal performance occurs if the cathode material is in intimate contact with the cathode current collector, and wherein the cathode current collector has a high surface area to enable a uniform contact between the cathode material and the collector. Attempts have been made in the art to increase the adherence of the cathode material to the current collector. However, no such attempts have been made in the field of solid state alkali metal anode cells containing radiation curable cathodes.

In addition, increased cell impedance is associated with the electrolyte layer. The relationship between impedance and thickness of the electrolyte layer is directly proportional in that increased cell impedance occurs when utilizing a thicker electrolyte. Accordingly, it is desirable to minimize the coating thickness of the electrolyte layer.

U.S. Pat. No. 4,589,197 to North discloses a solid state lithium anode cell including a lithium anode, a lithium ion conducting polymeric electrolyte, a cathode based on an intercalation compound, a polymer, and an electrically conductive particle, and a current collector. To produce the cell, the cathode composition is cast in a sheet or film from a solution in a solvent, the solvent is removed, and the electrolyte and anode are assembled with the cathode and current collector. The cathode becomes porous as a result of the voids created during solvent removal. To increase the density of the cathode, the cathode film, after casting, may be rolled between the nip of two pressure rollers, or rolled by other means.

Accordingly, there exists a need in the art for a solid state alkali metal anode laminar cell which has a low overall impedance at the electrolyte/cathode and cathode/current collector interfaces, and is capable of discharging a high amount of current per unit area over a broad temperature range.

SUMMARY OF THE INVENTION

The present invention relates to the manufacture of a solid state electrochemical alkali metal anode laminar cell, and to the manufacture of a cathode/current collector assembly for such a cell. The method is particularly characterized by pressure rolling the upper surface of the highly viscous cathode composition layer after it has coated onto the current collector. The rolling step reduces impedance by maintaining a tightly adherent contact between the cathode composition and the current collector, and by maintaining a continuous smooth surface on the cathode composition onto which a very thin electrolyte layer may be coated.

In prior art alkali metal anode laminar cells, the impedance associated with the cathode composition, and particularly at the cathode composition/electrolyte interface can be relatively high, causing a reduction in the overall efficiency of the cell. Further, as discussed above, impedance tends to increase with an increased electrolyte thickness. By rolling the cathode composition layer, external surface irregularities of the cathode composition are minimized, thereby allowing a less thick electrolyte layer to be coated thereon. Accordingly, the produced cell operates more efficiently than prior art cells.

In accordance with one embodiment of the present invention, a process for producing a cathode/current collector assembly for use in a solid state alkali metal anode laminar cell is provided. The method comprises the steps of:

coating a radiation or thermally polymerizable cathode composition onto a current collector;

rolling the surface of said cathode composition which is not in contact with said current collector to provide an external coating surface having minimal irregularities; and curing said cathode composition.

In accordance with another embodiment, a process for making a solid state laminar cell is provided. The process includes the steps of:

coating a cathode composition layer comprising an active cathode material, an electrically conductive filler material, an alkali metal salt, an inert solvent for said salt and a radiation or thermally polymerizable material onto a current collector;

rolling the external surface of said cathode composition to provide an external surface having minimal surface irregularities;

coating an ionically conductive, polymerizable electrolyte composition layer onto said cathode composition layer;

partially or totally curing said cathode composition and said electrolyte composition; and applying a laminar anode layer onto said electrolyte composition layer to form a cell assembly.

In practice, the preferred anode is a lithium foil or a lithium-coated metal foil. The preferred electrolyte is a polymeric network containing a solution of an ionizable alkali metal salt in a solvent, and the polymer is preferably polymerized by exposure to actinic radiation. The cathode composition preferably includes $V_6O_{13}$, electrically-conductive carbon particles and the above-described ionically conductive polymerizable electrolyte. In a particularly preferred embodiment the cathode composition is initially dispersed in a volatile solvent and solvent coated/cast onto the current collector. After evaporation of the solvent, the cathode composition is then pressure rolled. A preferred current collector material is a nickel foil having particles of nickel electrochemically deposited on the surface of the foil which contacts the cathode composition. In a particularly preferred embodiment where the electrolyte and cathode are partially cured, the entire assembly is subjected to an overall curing step after application of the alkali metal anode layer onto the electrolyte layer.

Utilization of the above method accomplishes the goals of providing a tightly adherent electrical contact between the cathode composition and the current collector, and providing a continuous smooth surface upon which a very thin electrolyte layer may be formed thereon. Accordingly, the resulting cell is capable of generating a high current discharge per unit area. Further, due to the reduction of cell impedance directly attributed to the cathode rolling step, the cell is more easily recharged.

A further embodiment of the present invention provides a solid state electrochemical laminar cell produced by the above-described process. The cell is particularly characterized by possessing a very thin electrolyte layer, and by possessing minimal interface impedance between the electrolyte layer and the cathode composition layer, and between the cathode composition layer and the current collector.

Accordingly, it is an object of the present invention to provide a method for producing a cathode/current collector assembly wherein the cathode composition is in tightly adherent electrical contact with the current collector.

A further object of the present invention is to provide a method for producing a solid state electrochemical-laminar cell wherein the cell is easily rechargeable as a result of the low impedance associated with the electrolyte layer, the electrolyte/cathode interface, and the cathode/current collector interface.

Still another object of the present invention is to provide a solid state electrochemical alkali metal anode laminar cell having low impedance wherein the cell is rechargeable.

Another object of the present invention is to utilize a radiation curable cathode composition wherein the amount of chalcogenide active material in the composition is maintained at a maximum.

These, and other objects, will be readily understood by one skilled in the art, as reference is made to the following drawings and detailed description of the preferred embodiment.

DETAILED DESCRIPTION OF THE PREFERRED EMBODIMENT

While describing the preferred embodiment, certain terminology will be utilized for the sake of clarity. It is intended that such terminology include not only the recited embodiment, but all technical equivalents which perform substantially the same function, in substantially the same way to achieve substantially the same result.

Figure 1:
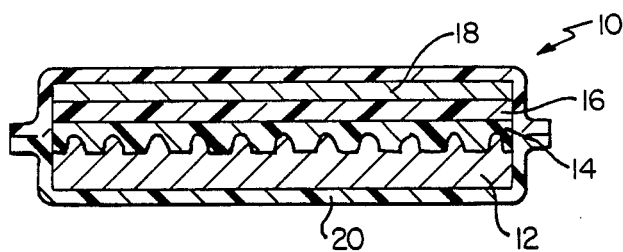
FIG. 1 is a side cut-away view of a cell embodying the teachings of the instant invention.

A laminar solid state cell produced in accordance with one embodiment of the present invention is shown in FIG. 1 and is represented by element 10. Cell 10 includes current collector 12, cathode composition layer 14, electrolyte composition layer 16 and alkali metal anode layer 18. Cell 10 also includes protective covering 20 which functions to prevent water and air from contacting the reactive layers of the cell.

Cell 10 is preferably a laminar thin cell type including a lithium anode. Laminar thin-cell batteries containing lithium anodes are known in the art, and it will be appreciated that the cell can include various constructions such as bi-faced or bi-polar cell designs. Examples of cell constructions include a "jelly roll" or a fan folded laminate strip design, both of which are illustrated in U.S. patent application Ser. No. 238,071 filed Aug. 30, 1988, which is hereby incorporated by reference.

The process for producing cell 10 is depicted in FIG. 2. Because the cell produced in accordance with the process of FIG. 2 utilizes an alkali metal anode layer, usually a lithium anode layer, it is necessary to manufacture the cell in a water (humidity) free environment. Lithium is extremely reactive with water and if reacted, a passivation layer can form on the surface of the anode layer, reducing the efficiency of the layer, and increasing cell impedance. Accordingly, it is particularly desirable to manufacture the cell in an environment having a relative humidity at room temperature of less than 2% (less than 300 ppm water). An environment containing between 1 ppm and 50 ppm water, and preferably less than 1 or 2 ppm water, produces a particularly efficient cell.

Figure 2A:
FIGS. 2(a)–(e) depict a process for producing the cell of FIG. 1 including the step of rolling the cathode composition once it has been coated onto the current collector in accordance with the teachings of the instant invention.

Referring to FIG. 2(a), cathode current collector 12 is provided. Collector 12 may be a sheet of metal foil such as aluminum, nickel or stainless steel, an electrically conductive screen, grid, foamed or expanded metal, etched foil, electrodeposited film, woven or nonwoven conductive fabric. In practice, a thin metal foil having a metal, preferably the same metal, electrodeposited on the surface which will contact the cathode layer is preferred. A preferred metal is known as surface-treated nickel. As seen in FIG. 2(a), the electrodeposited particles of nickel are designated as element 13. A microroughened or etched surface enables better adherence of the cathode composition to the current collector.

In practice, the thickness of current collector 12 ranges from about 5 microns to about 25 microns. Preferably, the current collector is as thin as practicable. Alternatively, the current collector can take the form of a thin polymeric film having coated thereon an electrically conductive metal. The advantage of this current collector is that it is extremely light-weight and can be utilized in extremely thin layers. An example of such a material is a polyethylene terephthalate substrate having electrodeposited thereon a first layer of copper and a second layer of nickel. The thickness of such a layer is typically about one micron but it may be as thin as practicable to minimize overall thickness of the cell.

Figure 2B:

Referring to FIG. 2(b), cathode composition 14 is coated onto the microroughened surface of current collector 12. In one embodiment, cathode composition 14 is paste-like in consistency and typically includes an active cathodic material such as a transition metal chalcogenide, or an intercalation compound and an electrically conductive filler or an electrically conductive polymer such as polypyrrole, polyacetylene, polyaniline, etc.; and an ionically-conductive electrolyte (described below).

Intercalation compounds and electrically conductive materials useful in the present invention are known in the art. Representative examples of transition metal oxides and sulfides useful as active cathode materials are $V_6O_{13}$, $V_2O_5$, $MoO_2$, $TiS_2$, $MnO_2$, $V_2O_5$, $MoS_3$, $Cr_3O_6$, $Li_xV_3O_8$, FeS, NiS, CoO and CuO. Other examples are described in the literature. The active cathode material preferably has a particle size of less than 1 micron but can range up to 20 microns.

A particularly preferred intercalation compound is $V_6O_{13}$ having a particle size less than 5 microns, and particularly less than one micron. $V_6O_{13}$ comprises between 25 and 75% by weight of the entire cathode composition, and preferably between 45 and 65%.

The electrically conductive filler is usually carbon particles. Certain conductive polymers (which are characterized by a conjugated network of double bonds) like polypyrrol and polyactylene may also be used for this purpose.

It is particularly desirable to maintain good contact between the cathode material and the carbon particles while maximizing the amount of cathode material available for ionic interaction. If the ratio of a cathode material such as $V_6O_{13}$ to carbon is greater than 10 to 1 by weight, the cathode composition provides poor electronic conductivity due to the lack of carbon. Conversely, if the ratio is less than 5 to 1, an excess of carbon is present which does not significantly improve electrical conductivity but does reduce capacity due to the reduced amount of intercalation compound present.

The optimum ratio of carbon to a transition metal chalcogenide will vary with particle size and processing or grinding techniques used. Preferably the carbon black and metal oxide are ball milled together. The preferred ratio is between 6 to 1 and 7 to 1. Moreover, unless the ratio of $V_6O_{13}$ to carbon is maintained between 5:1 and 10:1, it is very difficult to coat the cathode composition onto the current collector. If too much carbon is present, the cathode composition has a non-compacted sand-like consistency.

It has further been discovered that the impedance of the cathode composition is reduced when the particle size of the intercalation compound and the carbon filler is approximately equal, i.e., from less than 1 micron to about 5 microns. This can easily be accomplished by mixing and grinding the two components together.

The third component of the cathode composition is an ionically conductive electrolyte. This material is typically prepared from a composition which comprises a liquid, monomeric or prepolymeric polymerizable compound, and a solution of an ionizable alkali metal salt.

Ionizable alkali metal and alkaline earth salts useful in the electrolyte include those salts conventionally used in solid state electrochemical cells. Representative examples are $Li^+$, $Na^+$, $K^+$, $Mg^{2+}$, $Ca^{2+}$, and ammonium salts of less mobile anions of weak bases having a large anionic radius. Examples may be selected from the group consisting of $I^-$, $Br^-$, $SCN^-$, $ClO_4^-$, $BF_4^-$, $PF_6^-$, $AsF_6^-$, $CF_3COO^-$, $CF_3SO_3^-$, $CF_3CO_3^-$, $B_{12}H_{12}^{2-}$, $B_{10}Cl_{10}^{2-}$, and $B\phi_4^-$, where $\phi$ is $C_6H_5$, an alkyl chain or an aryl chain, and chain, wherein said salt cation and said salt anion are maintained in stoichiometric amounts. Specific examples are $LiAsF_6$, $LiClO_4$, $NaClO_4$, $LiF_3SO_3$, and $LiBF_4$, $LiAF_6$ is a particularly preferred salt as is it capable of being used in relatively high amounts.

The solvent for the salt can be any low volatile aprotic polar solvent. Preferably, these materials are characterized by a boiling point greater than about 80° C. Low volatility simplifies manufacture and improves shelf life. If the polymeric network is formed by radiation polymerization the solvent should be inert to the radiation and likewise if the network is formed by thermal polymerization, the solvent should be inert in this regard. In particular, the solvent should not scavenge free radicals. Representative examples are propylene carbonate, -butyrolactone, 1,3-dioxolane, and 2-methyltetrahydrofuran. Less polar solvents having heteroatoms capable of bonding alkali metal cations are also useful. Polyethylene glycol dimethyl ether (PEGDME) is one such example. Glymes such as tetraglyme, hexaglyme, and heptaglyme are also desirable solvents. Propylene carbonate is a preferred solvent.

Polymerizable compounds useful in the electrolyte composition may yield either a conductive or non-conductive polymer. Compounds which yield a conductive polymer contain a heteroatom capable of forming donor-acceptor bonds with the alkali metal cation. Useful polymerizable compounds are described next.

Polyethylenically unsaturated monomeric or prepolymonomeric materials useful in the present invention are preferably compounds having at least one, and more preferably a plurality, of heteroatoms (particularly oxygen and/or nitrogen atoms) capable of forming donor acceptor bonds with an alkali metal cation and are terminated by polymerizable moieties. These compounds yield a conductive supportive matrix. More specifically they are preferably low molecular weight oligomers of the formulae (I)–(III) below

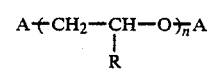 (I)

-continued

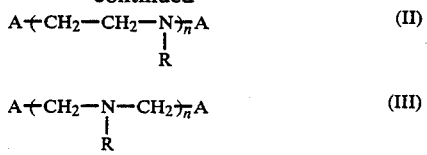

where n is about 3 to 50 and R is hydrogen or a C1–C3 alkyl group, which are terminated by ethylenically unsaturated moieties or glycidyl moieties represented by A.

A particularly useful group of polymerizable compounds is obtained by reacting a polyethylene glycol with acrylic or methacrylic acid. Also useful in the present invention are curable materials such as acrylated epoxies, e.g., Bisphenol A epoxy diacrylate, polyester acrylates, copolymers of glycidyl ethers and acrylates or a vinyl compound such as N-vinylpyrrolidone. The latter provide a non-conductive matrix.

The curable electrolyte mixture of this invention contains at least 45% by weight of the solvent and about 10 to 55% by weight and preferably 10 to 25% by weight of the polymerizable compound, as well as 5 to 20% by weight of the alkali metal salt. The exact amount of the polymerizable compound and the solvent should be adjusted to provide the optimum combination of strength and conductivity for the particular application. If the mixture contains greater than about 55% polymerizable material, the electrolyte exhibits poor conductivity. In those cases in which the electrolyte composition itself or an electrode composition containing the electrolyte is coated on a supporting member, such as a current collector or an electrode half element, the electrolyte often is not required to have the structural integrity of a free standing film. In those applications it is permissible and advantageous to use a higher quantity of the inert liquid because greater conductivity can be achieved, for example it is advantageous to use about 70 to 80% of the radiation inert liquid.

Preferably, the aforementioned polymerizable polyethylenically unsaturated compounds have a molecular weight of about 200 to 2,000 and more preferably 200 to 800. Still more preferably they are liquids at temperatures less than 30° C.. Examples of curable materials include polyethylene glycol-300 diacrylate (average PEO molecular weight about 300), polyethylene glycol-480 diacrylate (average PEO molecular weight about 480) and the corresponding methacrylates.

It may be desirable to include a curable comonomer in the composition to reduce the glass transition temperature and improve the conductivity of the polymer. Any suitable monoacrylate such as tetrahydrofurfuryl acrylate, tetrahydrofurfuryl methacrylate, methoxypolyethylene glycol monomethacrylate, 2-ethoxyethyl acrylate, 2-methoxyethyl acrylate or cyclohexyl methacrylate may be used for this purpose. Triacrylates such as trimethylolpropopane triacrylate (TMPTA), trimethylolpropane ethoxylated triacrylates (TMPEOTA) or trimethylolpropanepropoxy triacrylate may be used to introduce crosslinking of the polymer. Monoacrylates may be used in an amount of about 5 to 50% by weight based on the total amount of radiation polymerizable material. The triacrylates are used in amounts of about 2 to 30% by weight on the same basis.

The polymerizable electrolyte and cathode compositions described above may be polymerized by radiation, heat or other chemical means. In a particularly preferred embodiment the compositions are cured by exposure to an electron beam. The electron beam is capable of generating free radicals and initiating polymerization without any photoinitiator. To use other forms of radiation, a photoinitiator may be required. Similarly to cure the compositions by heating, a thermal initiator is required. Examples of thermally cured polymers are set forth in U.S. Pat. No. 4,792,504 to Schwab et al., which is hereby incorporated by reference.

Referring to FIG. 2(b), cathode composition 14 is coated as a thin film onto current collector 12 having a microroughened surface such as surface treated nickel, e.g. nickel foil having nickel dendrites electrodeposited on the surface. Coating may be accomplished using conventional coating techniques such as doctor blade or an extrusion method. In practice, the optimum thickness ranges between about 25 and about 250 microns. In practice, the cathode composition layer has an impedance less than 50 ohms/cm$^2$.

In an alternative embodiment, the cathode composition 14 may be first dispersed in a volatile solvent prior to coating onto substrate 12. The volatile solvent must be chemically inert with respect to the components of the cathode composition and preferably have a boiling point between 40° and 90° C., and more preferably less than 80° C. Examples of suitable solvents include tetrahydrofuran, dimethyl ether, methyl formate, acetone, low boiling point alcohols and low boiling point hydrocarbons (n-hexane, n-heptane, etc.). Other solvents, not specifically listed above, may be selected as long as they are chemically inert low boiling point liquids. Use of a volatile solvent provides benefits in that the viscosity of the coating composition is reduced, making it much easier to coat. In addition, because the solvent is ultimately evaporated, a higher amount of active cathode composition may be present in the dispersion. This can increase the amount of active composition present per unit area as compared to cathode compositions which are not initially solvent cast/coated. Accordingly, the electronic efficiency of the cell per unit area can be improved.

Figure 2C:
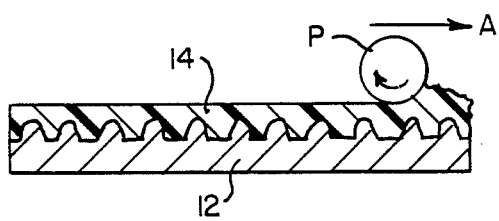

Referring to FIG. 2(c), after cathode composition 14 has been coated onto current collector 12, it is pressure rolled in the direction of arrow A by utilizing a nonstick pressure roller P, such as a PTFE roller. If the cathode composition 14 is initially dispersed and cast in a volatile solvent, the solvent is evaporated prior to the pressure rolling. Evaporation may be accomplished either by maintaining the coated current collector 12 at ambient conditions for an extended period of time, or more preferably, by heating the cathode composition coated current collector 12 to above the boiling point of the volatile solvent.

Rolling cathode composition 14 provides benefits in that it improves adherence between cathode composition 14 and current collector 12 and produces a smooth surface which enables a very thin electrolyte layer to be coated thereon. As a result of rolling cathode composition 14, the impedance associated with cathode composition 14 is significantly reduced as compared to a cell whose cathode is not rolled. The impedance is reduced as a result of the tight adherence of the cathode composition to the current collector. In addition, production of a continuous smooth surface enables a very thin electrolyte layer to be deposited thereon. As impedance increases with increased electrolyte thickness, the thin electrolyte layer possesses a comparatively low impedance. Hence, the overall cell efficiency is improved, for this additional reason.

The prior art, particularly U.S. Pat. No. 4,589,197 to North teaches the rolling of a solvent cast cathode composition after solvent evaporation. The sole purpose of rolling the cathode according to this reference is to increase the density of the cathode by eliminating pores caused by solvent evaporation. By comparison, according to the present invention, the pressure rolling step does not significantly affect the density of the radiation polymerizable cathode composition. Even in the embodiment where the radiation curable cathode composition is initially dispersed and cast from a solvent, the density of the cathode is not significantly affected by the rolling step because the presence of the radiation curable material significantly reduces the porosity of the cathode composition, even after solvent evaporation. In addition, the higher amount of active material that is capable of being coated by using a solvent cast method increases the density of the coating composition prior to solvent evaporation. As a result, any increase in porosity caused during solvent removal is minimal. All active components of the composition which are initially coated onto the current collector remain in the composition after curing. The rolling step functions to improve the adherence, and hence the electrical contact between the cathode composition and the current collector and thereby reduce the impedance at the cathode/current collector interface. Further, the continuous, high viscosity surface produced after rolling enables a very thin electrolyte layer to be coated thereon. The impedance at the interface according to the present invention is typically less than 10 ohms/cm$^2$ and, in the preferred embodiment, less than 5 ohms/cm$^2$.

Figure 3A:
FIGS. 3(a)–3(e) depict an alternative process for rolling the cathode composition once it has been coated onto the current collector in accordance with the teachings of the instant invention.
Figure 3B:
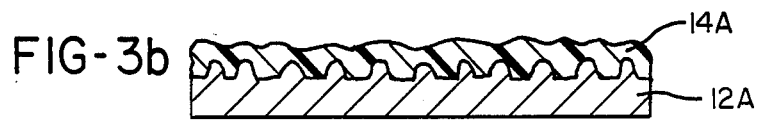
Figure 3C:
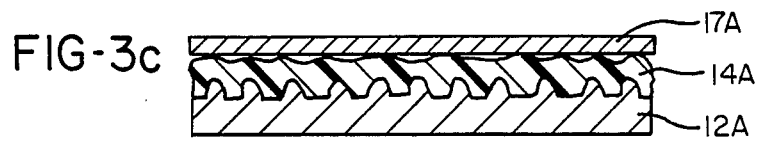
Figure 3D:
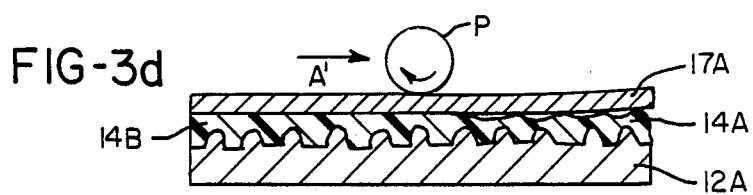
Figure 3E:
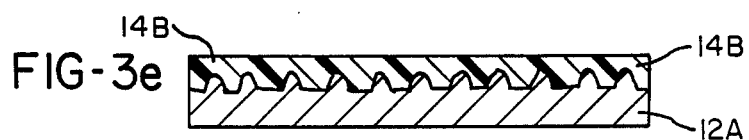
Figure 4:
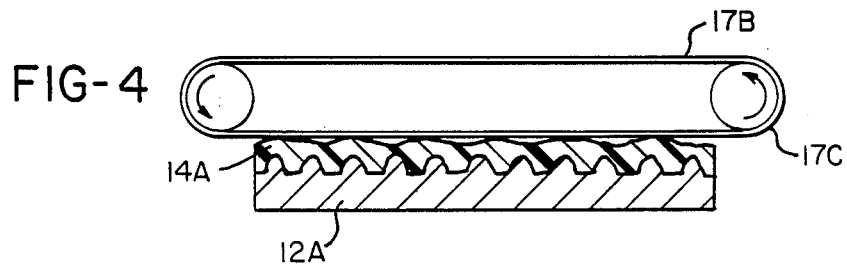
FIG. 4 depicts an alternative process for rolling the cathode composition once it has been coated onto the current collector in accordance with the teachings of the instant invention.

An alternative process for rolling the cathode composition is depicted in FIGS. 3(a)–3(e) and FIG. 4. Referring to FIGS. 3(a) and 3(b), cathode composition 14A is coated onto current collector 12A. Cathode composition 14A and current collector 12A are identical to the materials as described with respect to FIGS. 2(a)–2(b). After cathode composition 14A has been coated over the entire surface of current collector 12A, a non-stick release layer material 17A is applied onto the upper surface of cathode composition 14A as shown in FIG. 3(c). This material may be in the form of a release sheet 17A as shown in FIG. 3(c), or a continuous belt or drum 17B which is continuously rolled on and removed from the surface of cathode composition 14A as shown in FIG. 4. Material 17A or belt 17B is characterized in that the surface which contacts cathode composition 14A does not adhere to cathode composition 14A. Material 17A or belt 17B can be selected from a number of materials including polymeric films, metal foils, coated papers and the like. Metal foils and belts are particularly preferred materials, with aluminum or stainless steel foils or belts having a mirrored surface as represented by element 17C of FIG. 4 being the metals of choice.

Referring to FIG. 3(d), pressure roller P traverses the exterior surface of material 17A in the direction of arrow A' to cause a tight adherence between the cathode composition and the current collector. The area of the cathode composition which is treated with the pressure roller is designated as 14B in FIG. 3(d). Roller R may be either a stick or non-stick roller as it does not directly contact the cathode composition. Once roller R has traversed the entire length of material 17A, the assembly is cured by exposure to actinic radiation, and material 17A is removed from cathode composition 14A by peeling and the like. As shown in FIG. 3(e), the resulting cathode/current collector assembly includes cathode composition 14B containing a continuous external surface, which is produced as a result of the rolling operation.

Figure 2D:
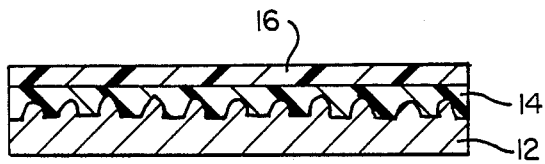

Referring now to FIG. 2(d), electrolyte layer 16 is coated as a thin film onto cathode composition 14. Electrolyte layer 16 must be an ionically conductive composition. In the preferred embodiment, electrolyte layer 16 comprises a solution of an alkali metal salt in an inert liquid, and a polymerizable material. An electrolyte identical to that disclosed above with respect to the cathode composition is particularly preferred (e.g., a solution of LiAsF$_6$ in propylene carbonate in a radiation polymerizable monomer such as polyethylene oxide diacrylate).

As a result of cathode layer 14 having been rolled to produce a external surface having minimal discontinuities, electrolyte 16 can be extruded and coated in a very thin layer, typically ranging from about 5 microns to about 25 microns. When electrolyte 16 is coated onto the external surface of cathode composition 14, it is coated in an uncured viscous liquid state. As is readily understood, electrolyte layer 16 must completely coat cathode composition layer 14 to prevent the intercalation compound and electrically conductive filler from protruding through electrolyte layer 16. As seen in FIG. 2(b), when cathode composition 14 is initially coated on current collector 12, the upper surface of cathode composition 14 is slightly irregular, having areas of higher protrusion. If not rolled, a thicker layer of electrolyte 16 would have to be coated thereon to completely cover the surface irregularities and thereby prevent the intercalation compound and electrically conductive filler from contacting the anode layer and spontaneously discharging. This would increase the impedance and thereby reduce the efficiency of the cell. The thickness of electrolyte layer 16 need only be thick enough to completely coat the external surface of cathode composition 14.

The impedance between the cathode composition and electrolyte interface is extremely small, being less than 25 ohm-cm$^{-2}$. It is hypothesized that the low interface impedance is obtained by the use of compositions having identical electrolytes, by maintaining a smooth coating surface for the electrolyte and by allowing a minimal amount of interface intermixing to occur.

Once electrolyte layer 16 has been coated onto cathode composition 14, the assembly is partially or totally cured by exposure to actinic radiation, heating or by utilizing a chemical polymerization method. In practice, exposure to an electron beam operating at a power of 3 to 9 Mrad is particularly preferred. Alternatively an ultraviolet source may be selected. If an ultraviolet source is selected, the monomer preferably includes an ultraviolet initiator of the type commonly known in the art such as thioxanthone initiators. Similarly, if thermal curing is selected, the cathode composition and electrolyte should include a thermal initiator. Curing the cathode composition and the electrolyte polymerizes and crosslinks and thereby solidifies the monomeric material by conversion to a polymeric form.

A partial curing step (as opposed to full curing) may be particularly desirable as this enables the electrolyte layer 16 to remain somewhat tacky. This enables better adherence between the electrolyte and the anode layer, when laminated.

After partial or total curing of cathode composition 14 and electrolyte 16, alkali metal anode layer 18 is applied to electrolyte layer 16. Although not pictured, a thin polymeric material such as a porous polypropylene sheet may be applied at the edges separating the anode and the electrolyte to ensure that the anode does not contact the cathode layer, particularly at the outer edges of the respective layers. Use of the polymeric material is optional.

Alkali metal anode 18 may take the form of a lithium foil, a lithium-coated foil such as nickel or copper foil having a layer of lithium deposited on its surface or a lithium alloy. Examples of lithium alloys include Li-Al, Li-Si, Li-Sn, Li-Cd, Li-Zn, Li-Pb and Li-N. However, in the most typical embodiment, a lithium foil or lithium-coated metal foil is used. In practice, commercially available foils are used which range from about 50 to 125 microns. Lithium is a preferred anode material because it is very electropositive and light in weight. However, other electropositive alkali metal materials, such as sodium, may be practiced within the scope of the invention.

Figure 2E:
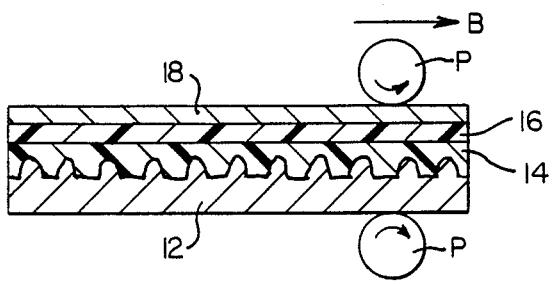

After anode layer 18 is laminated onto electrolyte 16, the entire assembly is optionally passed through pressure rollers P in the direction of arrows B as shown in FIG. 2(e). The pressure rolling step aids in the adhesion of the layers to each other, thereby reducing interfacial impedance between component layers.

If the cathode composition 16 and electrolyte 14 have not been completely cured, the entire assembly is again cured by exposure to actinic radiation, preferably electron beam radiation, heating and the like. This step functions to solidify the cathode composition and electrolyte layers, thereby producing a solid state cell.

Once the current collector, cathode composition, electrolyte composition and anode composition have been assembled, electrodes are attached to the anode and current collector layers by means known in the art. The assembly is then inserted into an air and water impermeable protective material and the edges of the protective material are sealed, preferably by heat sealing around edges of the cell components. Sealing preferably occurs under vacuum conditions to enable the protective material to form a tightly adherent seal around the component layers and electrodes such that the only external access to the component layers is via the electrodes.

Examples of heat sealable gas and water impermeable protective materials include a multi-layered material having an interior heat sealable layer comprising ethylene acrylic acid, an intermediate barrier layer comprising aluminum foil, and an exterior layer of polyethylene terephthalate. Other heat sealable protective materials known in the art can be used in accordance with the present invention. The protective materials should be as thin as possible to minimize the overall thickness of the cell. Commercially available heat sealable materials of the types described above can have an overall thickness of less than 200 microns.

The invention is illustrated in more detail by the following non-limiting examples.

EXAMPLES 1(a)–1(e)

In an inert, nitrogen environment, a cathode composition is prepared by grinding 300 parts of $V_6O_{13}$ for 24 to 48 hours in the presence of an equal amount of tetrahydrofuran in a one liter ball mill using 1.25 cm diameter ceramic balls. After grinding, the average particle size of $V_6O_{13}$ is about 1.5 microns. The slurry is transferred to an airtight mixer and 46.2 parts of predried carbon are added to the mixer to produce a slurry having a weight ratio of $V_6O_{13}$ to C of about 6.5 to 1. The mixture is stirred at low speed (20 rpm) under vacuum and heat, until the tetrahydrofuran is evaporated. The overall water content of the mixture is less than 100 ppm. 3 parts of polyethylene oxide (PEO) having a molecular weight greater than 100,000 is added to the $V_6O_{13}$/C powder mixture. The mixture is stirred for about 10 to 20 minutes to adequately disperse the polyethylene oxide. Propylene carbonate (PC), polyethylene glycol dimethyl ether (PEGDME), and trimethylolpropane ethoxylated triacrylate (TMPEOTA) are added to the mixture to produce a mixture having the following components:

| component | percent (weight) |
| --- | --- |
| $V_6O_{13}$ | 45 |
| C | 7 |
| PC | 37 |
| PEO | 1 |
| PEGDA | 8.5 |
| TMPEOTA | 1.5 |

The mixture temperature is increased to 65° C. and the mixture is stirred at low speed for 20 minutes. The speed of the mixer is increased to 75 rpm and the mixture is stirred for 2 to 3 additional hours.

The mixture is then coated onto a 5 cm×20 cm×25 micron high surface treated nickel foil available from Fukuda Metal Foil & Powder Co. Ltd. of Kyoto, Japan by utilizing a doctor blade technique at 50°–60° C. in a completely inert (nitrogen) environment containing less than 25 ppm water. The thickness of the cathode layer is 75 microns and the cathode layer is then covered with a stainless steel foil. A 2 inch diameter, 10 inch long stainless steel roller is placed on top of the foil and the roller is rolled along the length of the foil at a pressure of 5–10 kg/cm$^2$ to improve adherence of the cathode layer to the current collector. The assembly is then irradiated with a 3 Mrad dose of radiation by utilizing an electron beam source to cure the cathode layer. The foil is then peeled off of the cathode layer. The impedance of the cathode is less than 50 ohm/cm$^2$.

An electrolyte is prepared by mixing together the following components in the following weight fractions:

| component | percent (weight) |
| --- | --- |
| PC | 68 |
| LiAsF$_6$ | 18 |
| PEO | 2.5 |
| PEGDA | 9.2 |
| TMPEOTA | 2.3 |

The overall water concentration of the electrolyte is less than 50 ppm. The electrolyte is coated onto the cathode layer by using a doctor blade at room temperature. Different coating thicknesses of electrolyte were utilized to demonstrate the effect of the cathode rolling step. The electrolyte is then irradiated with a 3 Mrad dose of radiation from an electron beam source.

A 4 cm×12.5 cm×125 micron thick lithium strip (lithium metal/battery grade) available from Lithco of Bessemer City, N.C. is applied to one end of the electrolyte layer and the lithium strip is adhered to the layer by applying pressure from a 2 inch diameter, 10 inch long roller at 5–10 kg/cm² across the entire lithium surface. The opposite end of the electrolyte/cathode/current collector assembly is folded over the anode layer to form a bifaced cell. Copper tabs were spot welded to the current collector and pressure rolled onto the lithium foil to form electrodes for connection to a device.

Table 1 lists the discharge voltage for each of the different electrolyte coating thicknesses.

COMPARATIVE EXAMPLES 2(a)–(e)

Cells identical to that produced in Examples 1(a) through 1(e) were produced with the exception that no cathode composition rolling step was performed. Table 1 lists the discharge voltage for each of the different electrolyte coating thicknesses onto the cathode composition.

TABLE 1

| | Example | | | | | | | | | |
|---|---|---|---|---|---|---|---|---|---|---|
| | 1(a) | 1(b) | 1(c) | 1(d) | 1(e) | 2(a) | 2(b) | 2(c) | 2(d) | 2(e) |
| Coating thickness (microns) | 15 | 30 | 40 | 65 | 75 | 25 | 40 | 70 | 90 | 110 |
| Open Circuit voltage | 3.5 | 3.5 | 3.6 | 3.6 | 3.6 | 2.7 | 2.8 | 3.0 | 3.2 | 3.3 |

Having described the invention in detail and by reference to preferred embodiments thereof, it will be apparent that modifications and variations are possible without departing from the scope of the invention defined in the appended claims.

What is claimed is:

1. A process for making a solid state laminar cell comprising the steps of:
   coating a cathode composition layer comprising an active cathode material, an electrically conductive filler material, an alkali metal salt, an inert liquid solvent for said salt and a radiation or thermally polymerizable material onto a current collector;
   rolling the external surface of said cathode composition to provide an external surface having minimal surface discontinuities;
   coating an ionically conductive, radiation or thermally polymerizable electrolyte composition layer onto said cathode/composition layer;
   partially or totally curing said cathode composition and said electrolyte composition; and
   applying a laminar anode layer onto said electrolyte composition layer to form a cell assembly.

2. The process according to claim 1 comprising the additional step of applying pressure to said cell assembly to further adhere said layers.

3. The process according to claim 2 wherein said rolling step comprises rolling the surface of said cathode composition which is not in contact with said current collector with a non-stick pressure roller.

4. The process according to claim 2 wherein said rolling step comprises the steps of:
   applying a non-stick release layer material onto the surface of said cathode composition which is not in contact with said current collector;
   rolling the surface of said release layer material which is not in contact with said cathode composition with a pressure roller; and
   removing said release layer material.

5. The process according to claim 4 wherein said non-stick release material comprises a metal foil.

6. The process according to claim 2 wherein said rolling step comprises: rotating a rotatable belt having a non-stick external surface onto the surface of said cathode composition which is not in contact with said current collector; and removing the belt from said cathode composition layer.

7. The process according to claim 6 wherein said non-stick release surface comprises a mirrored surface.

8. The process according to claim 1 wherein said cathode composition is initially maintained in a volatile solvent and wherein said process comprises the additional step of evaporating said volatile solvent from said cathode composition, said evaporating step directly preceding said rolling step.

9. The process according to claim 8 wherein said rolling step comprises the steps of:
   applying a non-stick release layer material onto the surface of said cathode composition which is not in contact with said current collector;
   rolling the surface of said release layer material which is not in contact with said cathode composition with a pressure roller; and
   removing said release layer material.

10. The process according to claim 8 wherein said volatile solvent is selected from the group consisting of tetrahydrofuran, dimethyl ether, acetone, methyl formate, low boiling point alcohols and low boiling point hydrocarbons.

11. A solid state laminar cell produced by a process comprising the steps of:
    coating a cathode composition layer comprising an active cathode material, an electrically conductive filler material, an alkali metal salt, an inert solvent for said salt and a radiation or thermally polymerizable material onto a current collector;
    rolling the external surface of said cathode composition to provide an external surface having minimal surface discontinuities;
    coating an ionically conductive, radiation or thermally polymerizable electrolyte composition layer onto said cathode composition layer;
    partially or total curing said cathode composition and said electrolyte composition; and
    applying a laminar anode layer onto said electrolyte composition layer to form a cell assembly.

12. The cell according to claim 11 wherein said process comprises the additionally step of applying pressure to said cell assembly to further adhere said layers.

13. The cell according to claim 11 wherein said cathode composition is initially maintained in a volatile solvent and wherein said process comprises the additional step of evaporating said volatile solvent from said cathode composition, said evaporating step directly preceding rolling step.

14. The cell according to claim 12 wherein the thickness of said electrolyte layer is about 5 to about 25 microns.

15. The cell according to claim 14 wherein the impedance at the interface of said electrolyte and said cathode is less than about 25 ohms per square centimeter.

16. The cell according to claim 15 wherein the impedance at the interface of said cathode and said current collector is less than about 5 ohms per square centimeter.

* * * * *